United States Patent
Yun

(10) Patent No.: US 8,593,489 B2
(45) Date of Patent: Nov. 26, 2013

(54) DISPLAY APPARATUS AND CONTROL METHOD THEREOF

(75) Inventor: Young-kyan Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1165 days.

(21) Appl. No.: 12/502,681

(22) Filed: Jul. 14, 2009

(65) Prior Publication Data

US 2010/0110086 A1  May 6, 2010

(30) Foreign Application Priority Data

Nov. 5, 2008 (KR) .................. 10-2008-0109414

(51) Int. Cl.
 *G09G 5/00* (2006.01)

(52) U.S. Cl.
 USPC ........................... 345/660; 345/3.2

(58) Field of Classification Search
 USPC .................................. 345/3.2, 660
 See application file for complete search history.

(56) References Cited

U.S. PATENT DOCUMENTS

| 2003/0043143 | A1* | 3/2003 | Yu ................................. 345/418 |
| 2005/0078069 | A1* | 4/2005 | Aiba et al. ...................... 345/87 |
| 2007/0097024 | A1* | 5/2007 | Jung et al. ...................... 345/32 |
| 2007/0242068 | A1* | 10/2007 | Han et al. ...................... 345/427 |
| 2008/0085049 | A1* | 4/2008 | Naske et al. ................... 382/154 |
| 2009/0146914 | A1* | 6/2009 | Seong et al. ................... 345/6 |

* cited by examiner

*Primary Examiner* — Jeffrey Chow

(74) *Attorney, Agent, or Firm* — Sughrue Mion, PLLC

(57) ABSTRACT

Provided are a display apparatus and a control method thereof which supports image data at differing frame rates, such as 60 Hz and 120 Hz, input from an image supply source. The display apparatus includes a first scaler which processes input image data; a second scaler which processes input image data; a display unit which displays thereon the image data processed by the first and second scalers; and a controller which selectively controls based on a frame rate of the image data to process the image data by the first scaler only, or to divide and process the image data by both the first and second scalers.

15 Claims, 2 Drawing Sheets

DISPLAY APPARATUS AND CONTROL METHOD THEREOF

CROSS-REFERENCE TO RELATED APPLICATION

This application claims priority from Korean Patent Application No. 10-2008-1019414, filed on Nov. 5, 2008, in the Korean Intellectual Property Office, the disclosure of which is incorporated herein by reference.

BACKGROUND OF THE INVENTION

1. Field of the Invention

Apparatuses and methods consistent with the present invention relate to a display apparatus and a control method thereof, and more particularly, to a display apparatus and a control method thereof which supports input image data at frame rates of both 60 Hz and 120 Hz.

2. Description of the Related Art

A display apparatus processes an image input by an image supply source and displays the processed image on a display panel, such as a liquid crystal display or the like. The display apparatus scans image data on a panel to display an input image on the panel, and the scanned image data on the panel constitutes a single image frame.

The frame rate, which is typically represented as a frequency (Hz), means the number of image frames per second displayed on the panel. For example, 60 Hz means that 60 image frames per second are displayed on the panel.

120 Hz is a technology developed to increase the response rate of a display panel, and provides a high quality image by displaying more image frames per second on the panel.

A display panel at 120 Hz has mainly employed a technology that inserts new image frames between input images at 60 Hz. The newly inserted frames are generated by the display apparatus that estimates an intermediate image frame between frames of the 60 Hz input image. However, when the intermediate frame that is not originally present in the input image at 60 Hz is estimated and inserted, an image of games or sports games where a camera moves fast may be distorted.

Chipsets which provide a high quality image at 120 Hz have been developed for games or three-dimensional (3D) images. Accordingly, there is a need for a display apparatus that can process a high quality image at 120 Hz input from an image supply source including the chipsets is on the rise. A scaler of the display apparatus may support only a single link at 165 MHz or less in bandwidth. Thus, if a high quality input image at 120 Hz is processed, a process capacity of image data may be insufficient.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a display apparatus including: a first scaler which processes image data; a second scaler which processes the image data; a display unit which displays thereon the image data processed by the first and second scalers; and a controller which, based on a frame rate of the image data, selectively controls the first and second scalers the processing of the image data by the first scaler only or to divide and process the image data by both the first and second scalers.

If the frame rate of the image data is 60 Hz, the controller may control the first scaler only to process the image data.

The display apparatus may further include an image compensator which doubles the frame rate of the image data processed and output by the first scaler to 120 Hz.

If the frame rate of the image data is 120 Hz, the controller may control both the first scaler and the second scaler to divide and process the image data.

The display apparatus may further include an image converter which merges the image data processed and output by the first scaler and the second scaler, respectively, and outputs the merged image data to the display unit.

The first scaler and the second scaler may divide a single frame constituting the image data according to a predetermined rate and respectively process the image data corresponding to the divided frame.

The single frame constituting the image data may be divided into halves according to a resolution of the image data.

The first scaler and the second scaler may alternatively divide continuous frames constituting the image data, and respectively process the image data corresponding to the divided frames.

According to another aspect of the present invention, there is provided a control method of a display apparatus which includes a first scaler processing input image data and a second scaler processing image data, the control method including: determining a frame rate of the image data; and processing the image data by the first scaler only if the frame rate of the image data is a first rate, and dividing and processing the image data by both the first scaler and the second scaler if the frame rate of the image data is a second rate.

The first rate may be 60 Hz; and the second rate may be 120 Hz.

If the frame rate of the input image data is 60 Hz, the control method may further include doubling the frame rate of the image data output by the first scaler to 120 Hz and outputting the image data having the doubled frame rate to the display unit.

The control method may further include merging the image data output by the first scaler and the second scaler and outputting the merged image data to the display unit if the frame rate of the input image data is 120 Hz.

The dividing and processing the image data by the first scaler and the second scaler may include dividing a single frame constituting the image data according to a predetermined rate and respectively processing the image data corresponding to the divided frame area.

The single frame constituting the image data may be divided into halves according to a resolution of the image data.

The dividing and processing the image data by the first scaler and the second scaler may include alternatively dividing continuous frames constituting the image data and respectively processing the image data corresponding to the divided frames.

BRIEF DESCRIPTION OF THE DRAWINGS

The above and/or other aspects of the present invention will become apparent and more readily appreciated from the following description of exemplary embodiments, taken in conjunction with the accompanying drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
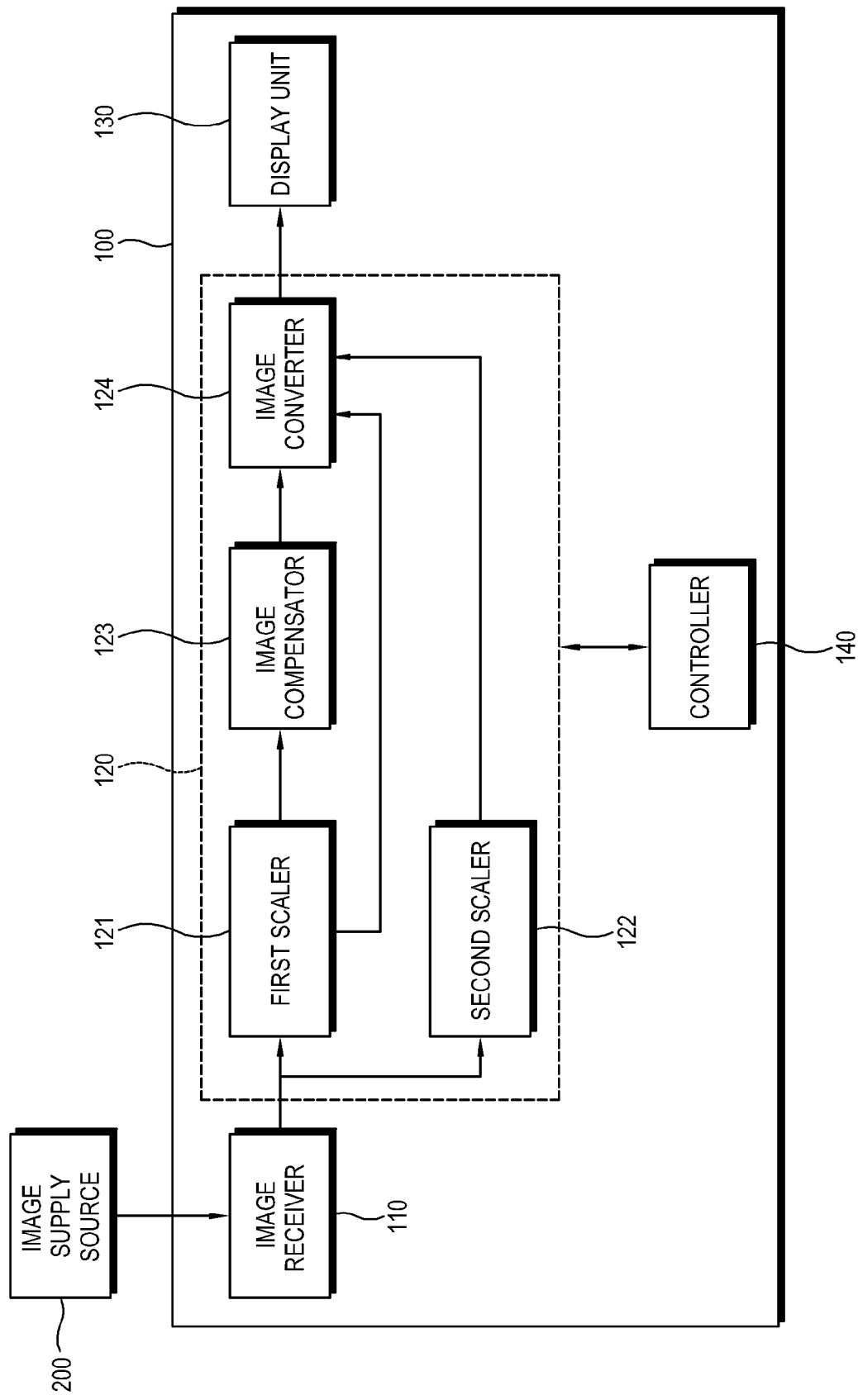
FIG. 1 is a block diagram of a display apparatus according to an exemplary embodiment of the present invention.

FIG. 1 is a block diagram of a display apparatus according to an exemplary embodiment of the present invention.

A display apparatus 100 according to an exemplary embodiment of the present invention processes image data received from an image supply source 200. The image supply source 200 generates image data or receive image data from an external source, and supplies the image data to the display apparatus 100. The image supply source 200 may include, but is not limited to, a computer including a central processing unit (CPU) (not shown) and a graphic card (not shown) and generating and supplying an image, a game console, a digital versatile disc (DVD) player, a set-top box, a server supplying an image to a network, or a transmission device of a broadcast station transmitting a broadcast signal via airwaves, a cable, or the like.

Further, according to the exemplary embodiment, the display apparatus 100 may include a monitor connected to a computer, a TV, or the like.

The display apparatus 100 processes image data having a frame rate such as 60 Hz or 120 Hz received from the image supply source 200, and displays the image data on a display unit 130. If, for example, image data at 60 Hz is input from the image supply source, only a first scaler 121 of the display apparatus 100 processes the image data. If image data at 120 Hz is input, the first scaler 121 and a second scaler 122 divide and process the image data, respectively.

As shown in FIG. 1, the display apparatus 100 includes an image receiver 110 which receives image data from the image supply source 200, an image processor 120 which processes image data received from the image receiver 110 and scans the image data to be displayed on the display unit 130, the display unit 130 which displays image data processed by the image processor 120, and a controller 140 which selectively controls the image processor 120 to process the image data or divide and process the image data based on a frame rate of the image data from the image supply source 200.

Hereinafter, elements of the exemplary display apparatus 100 will be described in detail.

The image receiver 110 receives image data from the image supply source 200, and supplies the image data to the image processor 120. The image receiver 110 may incorporate various standards, such as a digital video interface (DVI), a D-sub, or a high definition multimedia interface (HDMI).

The image processor 120 receives image data from the image receiver 110, and processes the image data to be displayed on the display unit 130. The image processor 120 includes a first scaler 121 which scales input image data in a suitable size and resolution to be displayed on the display unit 130, a second scaler 122 which is provided in parallel with the first scaler 121 with respect to input image data, an image compensator 123 which doubles image data processed by the first scaler 121 from 60 Hz to 120 Hz, and outputs the image data to an image converter 124, and the image converter 124 which outputs data processed by the first scalar 121 or merges the image data divided and processed by the first scaler 121 and the second scaler 122 and outputs the merged image data to the display unit 130.

The first scaler 121 and second scaler 122 convert the image data in a suitable size and resolution to be displayed on the display unit 130. For example, the first scaler 121 and second scaler 122 may receive an RGB signal as an analog signal or a transition minimized differential signal (TMDS) as a digital signal from the image supply source 200 through the image receiver 110, and process and convert the received signal into a low voltage differential signal (LVDS) to be displayed on the display unit 130. However, the standards of the signal are exemplary and the present invention is not limited thereto.

According to the exemplary embodiment of the present invention, if image data at 60 Hz is input from the image supply source 200, only the first scaler 121 processes the image data at 60 Hz according to a control of the controller 140 (to be described later) and outputs the image data to the image compensator 123. Alternatively, if image data at 120 Hz is input from the image supply source 200, exceeding a processing capacity of the first scaler 121, the first scaler 121 and second scaler 122 divide and process the image data at 120 Hz according to a control of the controller 140 and output the image data to the image converter 124.

Hereinafter, an example of when image data at a frame rate of 120 Hz is input from the image supply source 200, a process of dividing and processing the image data at 120 Hz by the first scaler 121 and second scaler 122 will be described in more detail.

For example, according to the exemplary embodiment of the present invention, if image data in a resolution of 1680×1050 and at a frame rate of 120 Hz (hereinafter "1680×1050@120 Hz") is input from the image supply source 200, the first scaler 121 and second scaler 122 respectively process an even channel and an odd channel of the image data 1680×1050@120 Hz, thereby processing image data 840×1050@120 Hz, respectively.

If the image data corresponds to 3D image, the first scaler 121 and second scaler 122 process left and right screens of a single frame, respectively. In this case, image data at 120 Hz is divided into left and right screens and displayed at 120 Hz. The image data displayed at 120 Hz provides a 3D image that is higher in quality than a 3D image of the image data divided into left and right screens and displayed at 60 Hz.

According to another exemplary embodiment of the present invention, the first scaler 121 and second scaler 122 may be responsible for alternate frames of input image data 1680×1050@120 Hz and process image data corresponding to 1680×1050@120 Hz, respectively. That is, the first scaler 121 and second scaler 122 process even or odd frames of the continuous frames, respectively.

In the present exemplary embodiment, when the image supply source 200 outputs image data at 60 Hz, the image compensator 123 doubles the image data processed by the first scaler 121 from 60 Hz to 120 Hz, and then outputs the image data to the image converter 124. A doubling process of image data from 60 Hz to 120 Hz is known for the skilled in the art, and detailed description will be avoided here.

In the case of divided and processed image data, the image converter 124 merges the image data divided and processed by the first scaler 121 and second scaler 122, and outputs the image data to the display unit 130. That is, the image converter 124 synchronizes the image data divided into left and right screens of a single frame or divided into even and odd frames of continuous frames, and processes the image data to display a single normal frame on the display unit 130. The image converter 124 synchronizes the image data doubled to 120 Hz by the image compensator 123 and outputs the image data to the display unit 130.

The display unit 130 includes, for example, a liquid crystal display (LCD), and displays an image processed by the image processor 120. The display unit 130 may display a single image frame by vertically arranging a plurality of horizontal scanning lines.

The controller 140 controls operations of the image processor 120, and particularly, according to the exemplary embodiment of the present invention, selectively controls the image processor 120 to process the image data by the first scaler 121 only or to divide and process the image data by both the first scaler 121 and second scaler 122, based on a frame rate of the image data input by the image supply source 200.

For example, if image data at 60 Hz is input from the image supply source 200, the controller 140 disables the second scaler 122 and controls the first scaler 121 to process the image data. Alternatively, if image data at 120 Hz is input from the image supply source 200, the controller 140 controls the first scaler 121 and second scaler 122 to divide and process the image data.

Figure 2:
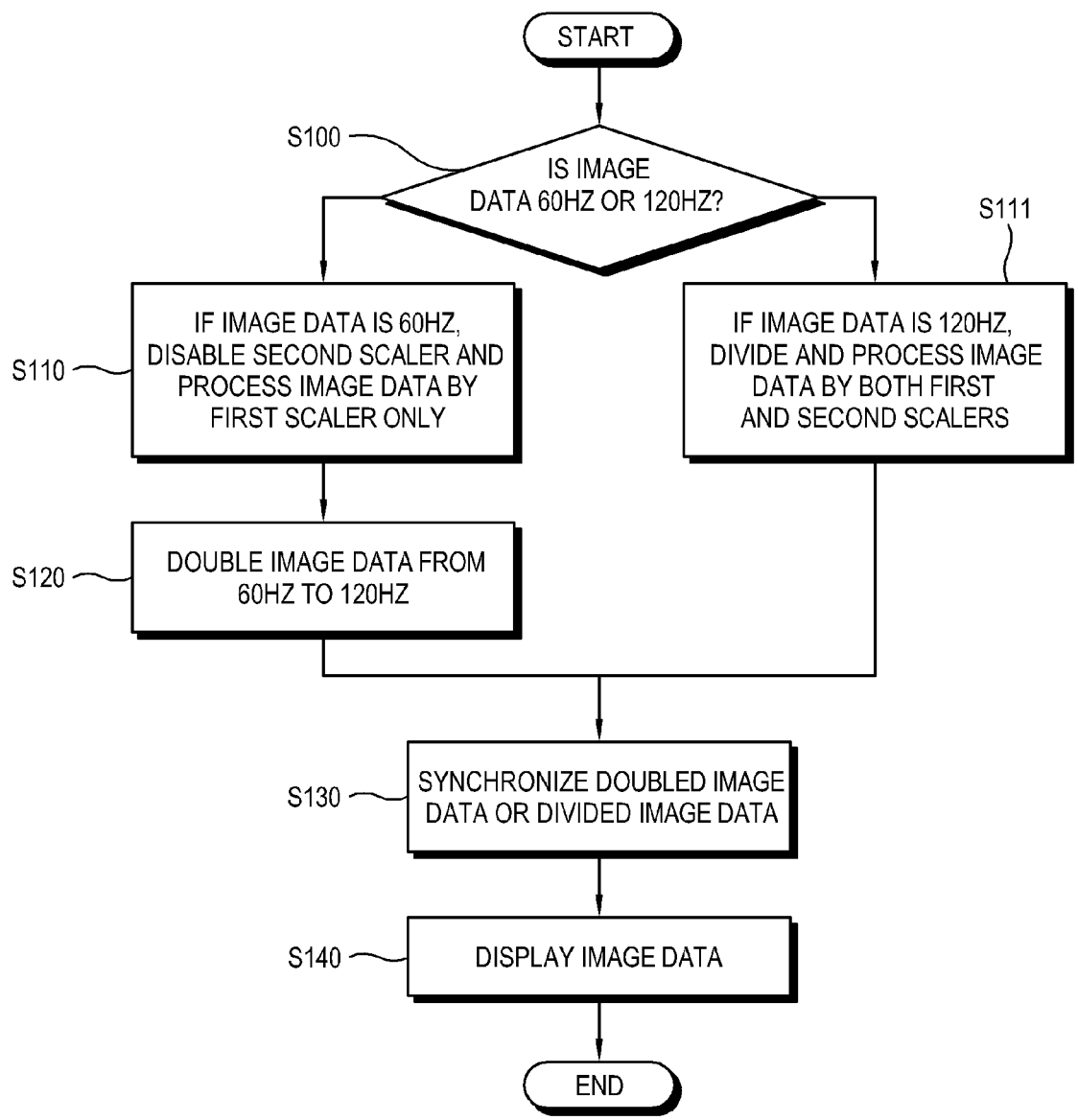
FIG. 2 is a flowchart of an image data processing of the display apparatus according to the exemplary embodiment of the present invention.

With the foregoing configuration, an exemplary control method of the display apparatus 100 according to the exemplary embodiment of the present invention will be described with reference to FIG. 2.

As shown therein, the controller 140 determines whether the frame rate of the image data input from the image supply source 200 is 60 Hz or 120 Hz (S100).

If it is determined that the frame rate of the image data is 60 Hz, the controller 140 disables the second scaler 122 and controls the first scaler 121 to process the image data at 60 Hz (S110).

The controller 140 controls the image compensator 123 to double the image data processed by the first scaler 121 from 60 Hz to 120 Hz (S120).

If it is determined that the image data is 120 Hz, the controller 140 controls the first scaler 121 and second scaler 122 to divide and process the image data at 120 Hz (S111).

The controller 140 controls the image converter 124 and synchronizes the image data doubled to 120 Hz by the image compensator 123 or the image data at 120 Hz divided and processed by both the first scaler 121 and second scaler 122 (S130).

The controller 140 displays the synchronized image data on the display unit 130 (S140).

Not only the image data at 60 Hz and 120 Hz input by the image supply source 200 are processed, but also an afterimage (ghosting) issue in game environment or video environment may be reduced. Thus, a display apparatus and a control method thereof according to the present invention may provide a high quality image.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a first scaler which processes image data;
a second scaler which processes the image data;
a display unit which displays the image data processed by the first and second scalers; and
a controller which selectively controls the first and second scalers based on a frame rate of the image data to process the image data by the first scaler only or to divide and process the image data by both the first and second scalers.

2. The display apparatus according to claim 1, wherein if the frame rate of the image data is 60 Hz, the controller controls the first scaler only to process the image data.

3. The display apparatus according to claim 2, further comprising an image compensator which doubles the frame rate of the image data processed and output by the first scaler to 120 Hz.

4. The display apparatus according to claim 1, wherein if the frame rate of the image data is 120 Hz, the controller controls both the first scaler and the second scaler to divide and process the image data.

5. The display apparatus according to claim 4, further comprising an image converter which merges the image data processed and output by the first scaler and the second scaler, respectively, and outputs the merged image data to the display unit.

6. The display apparatus according to claim 4, wherein the first scaler and the second scaler divide a single frame constituting the image data according to a predetermined rate and respectively process the image data corresponding to the divided frame of which the frame rate is 120 Hz.

7. The display apparatus according to claim 6, wherein the single frame constituting the image data is divided into halves according to a resolution of the image data.

8. The display apparatus according to claim 4, wherein the first scaler and the second scaler alternatively divide frames constituting the image data, and respectively process the image data corresponding to the divided frames.

9. A control method of a display apparatus which comprises a first scaler processing input image data and a second scaler processing image data, the control method comprising:
determining a frame rate of the image data; and
processing the image data by the first scaler only if the frame rate of the image data is a first rate, and dividing and processing the image data by both the first scaler and the second scaler if the frame rate of the image data is a second rate.

10. The control method according to claim 9, wherein the first rate is 60 Hz; and the second rate is 120 Hz.

11. The control method according to claim 10, further comprising if the frame rate of the input image data is 60 Hz, doubling the frame rate of the image data output by the first scaler to 120 Hz and outputting the image data having the doubled frame rate to the display unit.

12. The control method according to claim 10, further comprising merging the image data output by the first scaler and the second scaler, and outputting the merged image data to the display unit if the frame rate of the input image data is 120 Hz.

13. The control method according to claim 12, wherein the dividing and processing the image data by the first scaler and the second scaler comprises:
dividing a single frame constituting the image data according to a predetermined rate; and
respectively processing the image data corresponding to the divided frame of which the frame rate is 120 Hz.

14. The control method according to claim 13, wherein the single frame constituting the image data is divided into halves according to a resolution of the image data.

15. The control method according to claim 12, wherein the dividing and processing the image data by the first scaler and the second scaler comprises:
alternatively dividing continuous frames constituting the image data; and respectively processing the image data corresponding to the divided frames.

* * * * *